M. NOWAK.
MEASURING TOOL.
APPLICATION FILED APR. 1, 1920.

1,367,423.

Patented Feb. 1, 1921.
2 SHEETS—SHEET 1.

INVENTOR
Maximilian Nowak,
BY
Frantzef and Richards,
ATTORNEYS

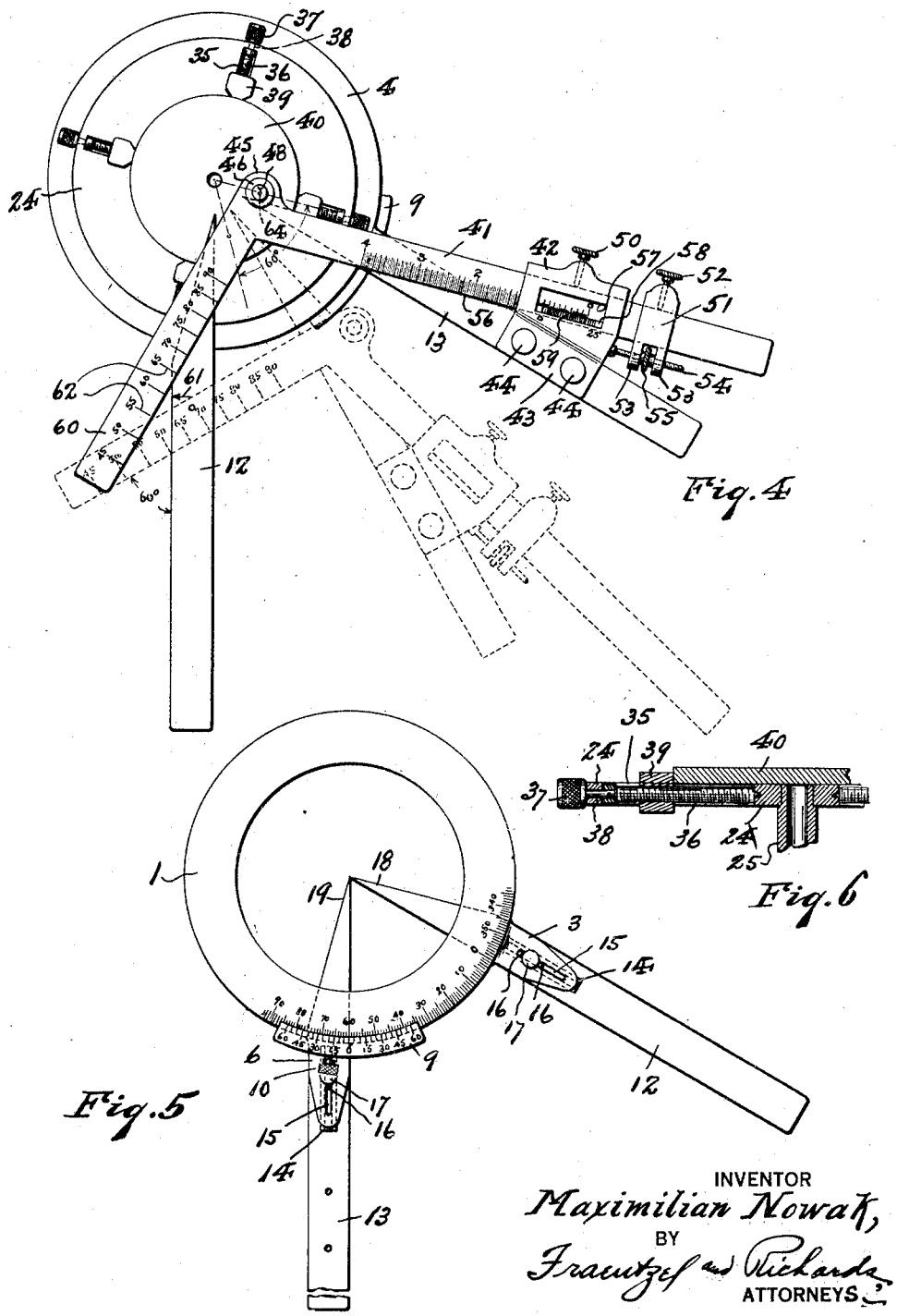

UNITED STATES PATENT OFFICE.

MAXIMILIAN NOWAK, OF ROSELLE, NEW JERSEY.

MEASURING-TOOL.

1,367,423.  Specification of Letters Patent.  Patented Feb. 1, 1921.

Application filed April 1, 1920. Serial No. 370,375.

*To all whom it may concern:*

Be it known that I, MAXIMILIAN NOWAK, a citizen of Czechoslovakia, residing at Roselle, in the county of Union and State of New Jersey, have invented certain new and useful Improvements in Measuring-Tools; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates, generally, to improvements in machinist's and draftsman's protractor and lay-out tool; and the invention has reference, more particularly, to a novel tool or measuring device for laying out work of various kinds, such as original work, jigs, templets, patterns, etc.

The invention has for its principal object to provide a novel composite tool for measuring angles, positioning drill holes, marking, measuring the angles of bevel gears and similar devices, and performing similar service in connection with laying out various kinds of work. To this end the tool is constructed in a novel manner so as to serve efficiently and conveniently in assisting the user to make accurate measurements requiring precise exactness.

Other objects of the present invention, not at this time more particularly enumerated, will be clearly understood from the following detailed description of the same.

With the various objects of the invention in view the same consists, primarily, in the novel protractor and lay-out tool hereinafter described; and, the invention consists, furthermore, in the novel arrangements and combinations of the various devices and parts, as well as in the details of the construction of the same, all of which will be hereinafter more fuly described, and then finally embodied in the appended claims.

The invention is clearly illustrated in the accompanying drawings, in which:—

Figure 1:
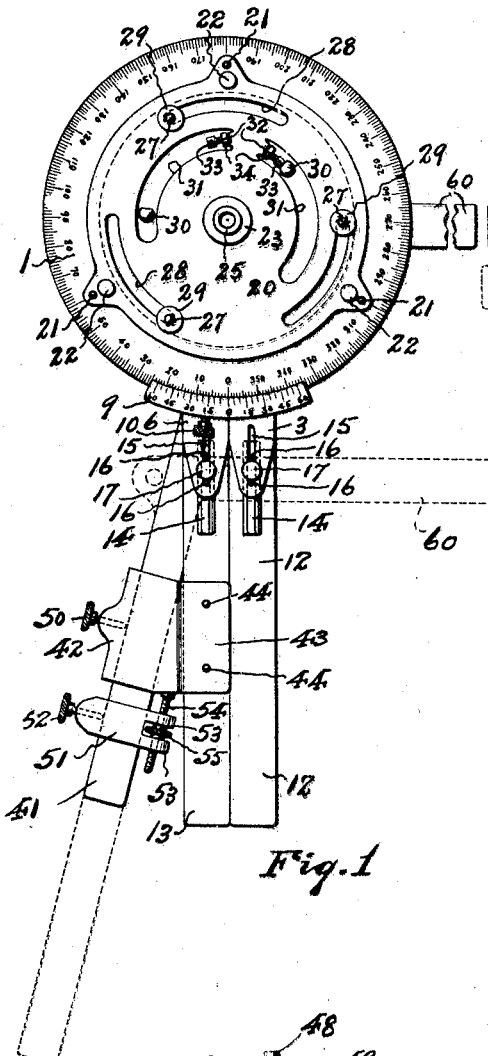
Figure 2:
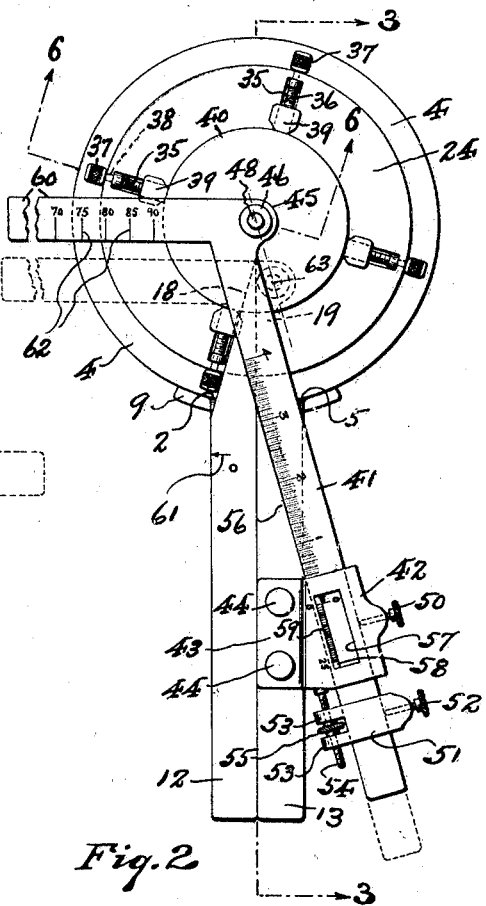
Figure 3:
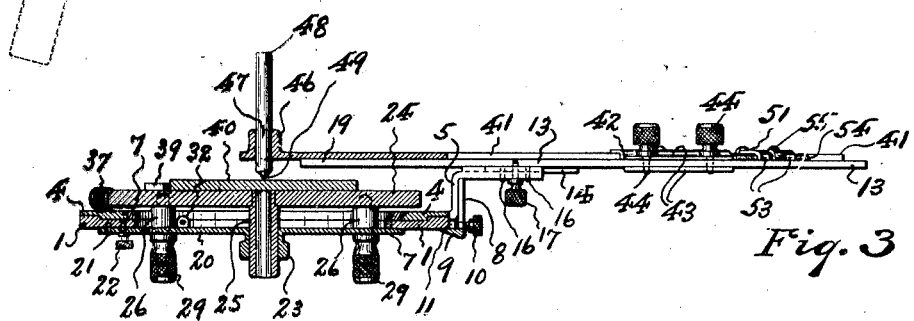

Figure 1 is a plan or face view of one side of the novel measuring tool made according to and embodying the principles of the present invention; Fig. 2 is a plan or face view of the reverse side of the same; Fig. 3 is a vertical longitudinal section, taken on line 3—3 in said Fig. 2; Fig. 4 is a view similar to that shown in Fig. 2, but illustrating some of the uses to which the tool may be put; Fig. 5 is a face or plan view of the tool stripped for use as a protractor; and Fig. 6 is a detail transverse section taken on line 6—6 in said Fig. 2, drawn on an enlarged scale, to illustrate the construction of the work holding means of the chuck-plate of the tool.

Similar characters of reference are employed in all of the hereinabove described views, to indicate corresponding parts.

Referring now to said drawings, the reference-character 1 indicates a main protractor scale ring having integrally connected with its periphery a vertically disposed arm 2, in turn provided at its free end with a horizontal outwardly extending supporting bracket 3 disposed in a plane parallel to the plane of said protractor scale ring. Associated with said protractor scale ring 1, so as to be rotatably slidable thereon, is a slide ring 4 also having integrally connected with its periphery a vertically disposed arm 5, which is also provided at its free end with a horizontal outwardly extending supporting bracket 6 disposed in a plane parallel to the plane of said protractor scale ring 1, and flush or level with said supporting bracket 3. Said slide ring 4 is maintained in operative sliding relation to said protractor scale ring 1, by means of an inner concentric overlapping keeper ring 7, which is suitably secured to the body of said protractor scale ring 1. The margin of the outer face of said protractor scale ring 1 is calibrated to provide a scale denoting the three hundred and sixty degrees of a circle. Secured by means of a vertical tongue 8 (or otherwise) to said arm 5 of the slide ring 4 is a vernier scale plate 9 which is vertically off-set to register with and slide over the calibrated face of said protractor scale ring 1. Said vernier scale plate is provided with a double vernier scale reading to the left and right from the central zero mark, so that subdivisions or minutes of the degrees of a circle may be read for angles turned either to the right or left. A lock-screw 10 screwed through said tongue 8 to operate a brake shoe 11 riding against the edge of said protractor scale ring 1 may be manipulated to lock the respective rings against movement from any angle measuring position to which they may have been set by the user.

Mounted upon said supporting bracket 3 is a scale ring leg 12, and mounted upon said supporting bracket 6 is slide ring leg 13. Said respective legs 12 and 13 are mounted upon their respective supporting brackets so as to be capable of a limited longitudinal movement upon the latter. The means for so mounting said legs comprises a longitudinal guide rib 14 projecting from a face of each leg, which is slidably fitted to a guide channel provided in the respective supporting brackets. Each of said supporting brackets is further provided with a longitudinal slot 15 into which extend and ride stop pins 16 which are fixed to the respective legs, and which by engagement respectively with the ends of said slots 15 limit the longitudinal movement of said legs in each direction. Said legs are locked or secured in either normal or retracted positions by means of lock-screws 17 the shanks of which extend through said slots 15 to screw into said legs, so that the shoulders of said lock screws may purchase against said supporting brackets when operated so as to draw said legs into frictionally bound immovable relation to said supporting brackets. Normally said legs 12 and 13 are closed together so that their opposed side edges are in mutual contact, in which position the protractor scale ring 1 on the one hand and the vernier scale plate 9 on the other, are disposed in a normal initial position so that the zero mark of former is registered with the zero mark of the latter. The forward ends of the respective legs 12 and 13 are obliquely cut away or tapered at their outer edges to provide the respective pointed terminals 18 and 19 normally converging in line with the central axis of the respective rings 1 and 4. The parts of the mechanism, thus far described, and stripped of the removable attachments to be subsequently described, constitutes a very simple and accurate protractor device for measuring and laying out angles, parts of circles and all similar work, and which may be very usefully applied by machinists and draftsmen for such purposes. In such uses the legs 12 and 13 are moved apart, in the manner illustrated in Fig. 5 of the drawings, until the vernier scale plate is set at the desired predetermined angle measurement relative to the scale ring 1, whereupon the angle described by the diverging legs will conform to such indicated angle. In the said Fig. 5 the legs diverge, as indicated by the reading of the vernier scale plate on the scale ring, at an angle of sixty degrees.

The reference-character 20 indicates a carrier plate, the same being removably attached upon the outer face of said protractor scale ring 1. Said scale ring 1 is provided with a plurality of outwardly projecting fixed positioning pins 21, said carrier plate having a plurality of openings to receive said positioning pins, so that the same is fixed against rotary displacement from its normally disposed attached relation to said scale ring. Fastening screws 22 serve to hold said carrier plate against withdrawal from attached relation to said scale ring. Said carrier plate is provided with a central hub portion 23 which is alined with the central axis of said scale ring when the plate is in position. Arranged in supported relation to said carrier plate 20, so as to be disposed above the exterior face of said slide ring 4, is a chuck plate 24, the same having a centrally disposed tubular stem 25 extending from the inner side thereof, so as to be journaled in said hub portion 23 of said carrier plate, thus mounting said chuck plate for rotative movement relative to said carrier plate. Also projecting from said inner side of said chuck plate are a plurality of supporting pieces 26, the same being suitably spaced one from the other. Connected with the free ends of said supporting pieces 26 are screw-threaded shanks 27 of reduced diameter. Said shanks 27 extend respectively through arcuate slots 28 provided in said carrier plate 20, so as to project exteriorly from the outer face of the latter. Screwed upon said shanks 27 are lock nuts 29 which serve to bind or fix the chuck plate 24 to said carrier plate 20, thus holding the same not only against removal from operative assembled relation to the device, but also against rotative movement from initially adjusted position. Also projecting from the inner side of said chuck plate are a pair of stop posts 30. Said stop posts 30 project through additional arcuate slots 31 provided in said carrier plate 20, said slots 31 being concentric to the axis of said carrier plate and chuck plate, and positioned, preferably intermediate the said axis and said slots 28. The adjacent ends of said slots 31 are suitably spaced apart, and are each provided with an inwardly projecting lug or ear 32 having an internally threaded opening in which is engaged an adjustable abutment screw 33, the latter being further provided with a lock nut 34 for holding said abutment screw in desired adjusted position. The chuck plate 24, when the lock nuts 29 are loosened, may be turned to position either one or the other of its stop posts 30 in stopped relation to its respective abutment screw 33, for purposes to be subsequently more particularly mentioned. Said chuck plate 24 is provided with a plurality of radially disposed slots 35 in which are mounted feed screws 36. Each feed screw 36 is provided with a finger piece 37 for manipulating the same, said finger pieces being located at the outer periphery of said chuck-plate, and the same having stems 38 journaled in the marginal body of said chuck plate, with their inner ends operatively secured to said respective feed screws.

Threaded respectively on said feed screws are adjustable chuck jaws 39, which by the turning of said feed screws may be caused to travel back and forth relative to the center of the chuck plate. The reference character 40 indicates the work to be operated upon. The same being mounted and supported on said chuck-plate 24, and rigidly secured in properly centered position thereon, by engaging the respective chuck-jaws 39 in gripping relation to the periphery thereof.

Detachably related to said slide ring leg 13 is marker bar 41. The means for mounting said marker bar in association with said slide ring leg consists of a slideway member 42 having a bifurcated yoke portion or supporting flange 43 adapted to be slipped edgewise over the leg 13 in a properly located and predetermined position. Said yoke portion and said leg 13 are provided with openings which, when the same are properly alined, permit the insertion therethrough of tapered holding pins 44 which serve to interlock said parts together in operative mutually assembled relation. The said slideway member 42 and its yoke portion 43 are so shaped that when attached in operative relation to the leg 13, the slideway member 42 is angularly off-set from the outer edge of said leg, so that as the marker-bar 41 extends slidably and longitudinally through the said slideway member, its forward end extends over the pointed terminals 18 and 19 of the legs 12 and 13 when the latter are closed together in normal initial position. Said marker bar 41 is provided at its forward or inner end with a laterally and outwardly off-set portion 45 provided with an upwardly projecting boss 46 having a vertical opening 47, through which may be inserted, and by which may be held, a perpendicular marking tool 48 having its marking point 49 presented against the surface of the work 40 secured to said chuck plate 24. Said marker bar 41 may be locked against sliding movement through said slideway member 42 by means of a set screw 50, which is mounted to screw through the outer portion of said slideway member so that its biting or binding end will engage the edge of said marker bar. Engaged over the outer end of said marker bar 41 is a thrust block 51 which may be rigidly secured to the same by means of a set screw 52. Said thrust block 51 is provided at its inner side with a bifurcated portion forming a pair of perforate ears 53 through which passes a vernier adjusting screw 54 which is secured to and which projects longitudinally outward from an end of said slideway member 42, so as to parallel the inner edge of said marker bar. Operatively mounted upon said screw 54, but held in embraced relation between said perforate ears 53 is an adjusting nut 55. Inscribed upon the outer face of said marker bar 41 is an inch scale 56 graduated to fortieth parts of an inch. The outer face of said slideway member 42 is provided with a longitudinal rectangular opening 57 through which the scale 56 may be read. At one side of said opening is a longitudinal chamfered lip 58 having inscribed thereon a vernier scale 59. When it is desired to use the marker bar 41, the legs 12 and 13 are released by loosening the lock screws 17 and then retracted to the outward limit of movement so that their pointed terminals 18 and 19 are drawn back from normal converging alinement with the axis or center of the rings 1 and 4, thus permitting the marker bar 41 to be slid forward to normal initial operative position, with the marking tool 48 alined with the axis or center of the rings 1 and 4. When the marker arm is in such normal initial position, the zero of the vernier scale 59 registers with the zero of the linear or inch scale 56 of the marker bar. By screwing home the set screw 50 the bar 41 may be locked in such position.

The forward end of said marker bar is further provided with a laterally extending arm 60, which springs from its inner side, so that when the marker bar is moved or slid outwardly, said arm 60 crosses said leg 12. The arm 60 is angularly disposed relative to the bar 41 so that, when the legs 12 and 13 are closed together in normal initial position, it will project at right angles to the outer edge of said leg 12, forming in conjunction therewith a square, as indicated by the dotted representations of the parts in Fig. 1 of the drawings. The leg 12 may be provided with a stop mark 61 with which the inner edge of said arm 60 may be registered by sliding outward the bar 41 and then locking the same to hold the arm in such relative position. The face of the arm 60 may be calibrated with graduations 62 indicating, when the said marks are respectively registered with the outer edge of said leg 12 the degree of the angle included between the arm 60 and said leg 12, as shown by dotted lines in Fig. 4 of the drawings. This feature of the tool permits of the angular measurement of bevel gears, etc. Of course if it is desired the calibrations or graduations 62 may be extended beyond 45° indicated by lengthening the arm 60, and if desired the calibrations or graduations 62 may be omitted since it is quite easy to calculate the angle included between the arm 60 and leg 12 by reference to the scale ring reading, since the sum of the angle of divergence to which the legs 12 and 13 are moved and the said angle included between the arm 60 and leg 12 will always equal 90°, consequently by subtracting the reading of the scale ring from 90° the result will give the degree of the angle between the arm 60 and leg 12.

As an example of one character of work which may be very conveniently accomplished with the aid of my novel protractor and lay out tool, I will assume it is desired to lay out the positions of drill holes to be made in the work 40. The work being secured upon the chuck plate 24, and the legs 12 and 13 closed in normal initial position, a center may be established by reciprocating the marking bar 41 to cause the marking tool 48 to describe a diametrically extending line upon the surface of the work, and then opening the legs to any desired angular relation, again reciprocating the marking bar to cause the marking tool to describe another diametric line intersecting the first, the point of intersection indicating a center from which the position of the desired holes may be calculated. Assume that it is desired to locate a hole one inch from the center. The legs 12 and 13 are closed to normal initial position, and then the marking bar 41 is drawn outwardly until the zero mark of the vernier scale 59 registers with the one inch mark of the scale 56. The marking bar is then locked against movement by tightening the set screw 50. By then tapping the upper end of the marking tool 48 a positioning punch mark 63 may be produced upon the surface of the work, this positioning of the parts and operation being indicated by dotted lines in Fig. 2. Assume that it is now desired to locate a hole eight tenths of an inch from the center, and at an angle of sixty degrees from the first located hole. The legs 12 and 13 are moved apart so as to register the zero mark of the vernier scale plate 9 with the sixty degree calibration of the scale ring 1, and the rings 1 and 4 are locked in such position by screwing home the lock screw 10. The marker bar 41 is then released and adjusted to position the eight tenths mark of the scale 56 on the zero mark of the vernier scale 59, and again locked. Thereupon the marking tool 48 may be tapped to produce the positioning punch mark 64 in the proper location. In this general way drill holes may be located at any desired point on the surface of the work 40, or concentric lines at desired distances of separation may be located. Since, however, the leg 13 cannot be moved around the complete three hundred and sixty degrees of the circle because of their mutual obstruction, I have provided the means for shifting the work rotatively through an arc of a desired predetermined degree, so that by turning back the legs to normal initial position after the work is thus shifted, the remaining surface of the work not capable of being otherwise reached may be operated upon. This predetermined rotative shift of the work may be accomplished by loosening lock-nuts 29 so that the chuck-plate 24 may be rotated to carry the disengaged stop-post 30 into engagement with the abutment screw 33 at the end of the slot in which said post rides.

I will also call attention to the fact that by aid of the vernier scale 59, the marker bar may be shifted longitudinally to the thousandth part of an inch. The marker bar is brought to the approximate position desired, and then by leaving the set screw 50 loose but tightening the set screw 52 to lock said thrust block 51 to the bar 41, the adjusting nut 55 may be turned on the vernier adjusting screw 54 to transmit the necessary delicate movement to the bar 41 to bring the same to the desired position to the thousandth of an inch, after which the bar 41 may be locked by the set screw 50.

Other kinds of work may be accomplished with the aid of my novel protractor and lay out tool, as will be readily understood, without necessity of further detailed description. For example, I may reverse the position of the chuck plate 24 so that it is attached to the exterior face of the carrier plate 20 to project from the scale ring side of the device. Pipe or cylindrical objects may be supported by engaging the end thereof in the chuck jaws. When so arranged the leg 13 (the marker bar devices being detached) may be fixed or clamped to an angle plate supported by a surface plate, and then by manipulating the other leg 12 to operate the scale ring 1 to turn the same to the number of degrees desired, the pipe or cylindrical object is turned therewith, so that lines spaced apart at a desired number of degrees may be marked on the surface of said object, by means of a surface gage moved along said surface plate.

I am aware that some changes may be made in the several arrangements and combinations of the various devices and parts, as well as in the details of the construction of the same, without departing from the scope of the present invention as set forth in the foregoing specification, and as defined in the appended claims. Hence, I do not limit my invention to the exact arrangements and combinations of the several devices and parts described in the foregoing specification, nor do I confine myself to the exact details of the construction of the said parts as illustrated in the accompanying drawings.

I claim:—

1. In a device of the kind described, a protractor scale ring, a slide ring rotatably slidable relative to said scale, each ring having a radial leg, means for securing said legs respectively to said rings in an off-set plane parallel to the plane of said rings, a vernier scale plate movable with said slide ring having its scale arranged to coöperate with the scale of said scale ring, said respective legs of said rings having pointed terminals at their inner ends normally converging on the axis of rotation of said rings, work supporting means in attached relation to said scale ring, a marker bar, means for slidably supporting said marker bar in association with said slide ring leg, means connected with the inner end of said marker bar for supporting a marking tool, and means for interconnecting said legs with said securing means therefor whereby a limited outward retraction of the same is provided for to permit the centering of said marking tool relative to the work.

2. In a device of the kind described, a protractor scale ring, a slide ring rotatably slidable relative to said scale ring, each ring having a radial leg, means for securing said legs respectively to said rings in an off-set plane parallel to the plane of said rings, a vernier scale plate movable with said slide ring having its scale arranged to coöperate with the scale of said scale ring, said respective legs of said rings having pointed terminals at their inner ends normally converging on the axis of rotation of said rings, work supporting means in attached relation to said scale ring, a marker bar, means for slidably supporting said marker bar in association with said slide ring leg, means connected with the inner end of said marker bar for supporting a marking tool, means for interconnecting said legs with said securing means therefor whereby a limited outward retraction of the same is provided for to permit the centering of said marking tool relative to the work, said marker bar having a calibrated scale, said marker bar supporting means having a vernier scale coöperating with the scale of said marker bar, a thrust block on said marker bar having a nut piece assembled therewith, a vernier adjusting screw connected with said marker bar supporting means with which said nut piece is engaged, and means for locking said thrust block in secured relation to said marker bar.

3. In a device of the kind described, a protractor scale ring having a radial leg, a slide ring also having a radial leg, said slide ring being rotatably slidable relative to said scale ring, a vernier scale plate movable with said slide ring having its scale arranged to coöperate with the scale of said scale ring, and work supporting means in attached relation to said scale ring.

4. In a device of the kind described, a protractor scale ring having a radial leg, a slide ring also having a radial leg, said slide ring being rotatably slidable relative to said scale ring, a vernier scale plate movable with said slide ring having its scale arranged to coöperate with the scale of said scale ring, a carrier plate secured to said scale ring, a chuck-plate mounted in connection with said carrier plate for rotation about the axis of said rings, means permitting a limited rotative adjustment of said chuck plate and means for locking said chuck-plate in adjusted position.

5. In a device of the kind described, a protractor scale ring having a radial leg, a slide ring also having a radial leg, said slide ring being rotatably slidable relative to said scale ring, a vernier scale plate movable with said slide ring having its scale arranged to coöperate with the scale of said scale ring, a carrier plate secured to said scale ring, a chuck-plate mounted in connection with said carrier plate for rotation about the axis of said rings, means permitting a limited rotative adjustment of said chuck plate, means for locking said chuck-plate in adjusted position, a marker bar, means for slidably supporting said marker in association with said slide ring leg, and means at the inner end of said marker bar for supporting a marker tool.

6. In a device of the kind described, a protractor scale ring having a radial leg, a slide ring also having a radial leg, said slide ring being rotatably slidable relative to said scale ring, a vernier scale plate movable with said slide ring having its scale arranged to coöperate with the scale of said scale ring, a carrier plate secured to said scale ring, a chuck-plate mounted in connection with said carrier plate for rotation about the axis of said rings, means permitting a limited rotative adjustment of said chuck plate, means for locking said chuck plate in adjusted position, a marker bar, means for slidably supporting said marker bar in association with said slide ring leg, means at the inner end of said marker bar for supporting a marker tool, said marker bar having a calibrated scale, said marker bar supporting means having a vernier scale coöperating with the scale of said marker bar, a thrust block on said marker bar having a nut piece assembled therewith, a vernier adjusting screw connected with said marker bar supporting means with which said nut piece is engaged, and means for locking said thrust block in secured relation to said marker bar.

7. In a device of the kind described, a protractor scale ring having a radial leg, a slide ring also having a radial leg, said slide ring being rotatably slidable relative to said scale ring, a vernier scale plate movable with said slide ring having its scale arranged to coöperate with the scale of said scale ring, a carrier plate secured to said scale ring, a chuck-plate mounted in connection with said carrier plate for rotation about the axis of said rings, means permitting a limited rotative adjustment of said chuck plate, means for locking said chuck-plate in adjusted position, a marker bar, means for slidably supporting said marker bar in association with said slide ring leg, means at the inner end of said marker bar for supporting a marker tool, said marker bar having a calibrated scale, said marker bar supporting means having a vernier scale coöperating with the scale of said marker bar, a thrust block on said marker bar having a nut piece assembled therewith, a vernier adjusting screw connected with said marker bar supporting means with which said nut piece is engaged, means for locking said thrust block in secured relation to said marker bar, and a laterally extending arm connected with the inner end of said marker bar adapted when said legs of said respective rings are closed in normal initial position to extend across said scale ring leg at right angles thereto.

8. In a device of the kind described, a protractor scale ring having a radial leg, a slide ring also having a radial leg, said slide ring being rotatably slidable relative to said scale ring, a vernier scale plate movable with said slide ring having its scale arranged to coöperate with the scale of said scale ring, a carrier plate secured to said scale ring, a chuck-plate mounted in connection with said carrier plate for rotation about the axis of said rings, means permitting a limited rotative adjustment of said chuck plate, means for locking said chuck-plate in adjusted position, a marker bar, means for slidably supporting said marker bar in association with said slide ring leg, means at the inner end of said marker bar for supporting a marker tool, and a laterally extending arm connected with the inner end of said marker bar adapted when said legs of said respective rings are closed in normal initial position to extend across said scale ring leg at right angles thereto.

9. In a device of the kind described, a protractor scale ring, a slide ring rotatably slidable relative to said scale ring, each ring having a radial leg, means for securing said legs respectively to said rings in an off-set plane parallel to the plane of said rings, a vernier scale plate movable with said slide ring having its scale arranged to coöperate with the scale of said scale ring, said respective legs of said rings having pointed terminals at their inner ends normally converging on the axis of rotation of said rings, work supporting means in attached relation to said scale ring, a marker bar, means for slidably supporting said marker bar in association with said slide ring leg, means connected with the inner end of said marker bar for supporting a marking tool, means for interconnecting said legs with said securing means therefor whereby a limited outward retraction of the same is provided for to permit the centering of said marking tool relative to the work, and a laterally extending arm connected with the inner end of said marker bar adapted when said legs of said respective rings are closed in normal initial position to extend across said scale ring arm at right angles thereto.

10. In a device of the kind described, a protractor scale ring, a slide ring rotatably slidable relative to said scale ring, each ring having a radial leg, means for securing said legs respectively to said rings in an off-set plane parallel to the plane of said rings, a vernier scale plate movable with said slide ring having its scale arranged to coöperate with the scale of said scale ring, said respective legs of said rings having pointed terminals at their inner ends normally converging on the axis of rotation of said rings, work supporting means in attached relation to said scale ring, a marker bar, means for slidably supporting said marker bar in association with said slide ring leg, means connected with the inner end of said marker bar for supporting a marking tool, means for interconnecting said legs with said securing means therefor whereby a limited outward retraction of the same is provided for to permit the centering of said marking tool relative to the work, said marker bar having a calibrated scale, said marker bar supporting means having a vernier scale coöperating with the scale of said marker bar, a thrust block on said marker bar having a nut piece assembled therewith, a vernier adjusting screw connected with said marker bar supporting means with which said nut piece is engaged, means for locking said thrust block in secured relation to said marker bar, and a laterally extending arm connected with the inner end of said marker bar adapted when said legs of said respective rings are closed in normal initial position to extend across said scale ring leg at right angles thereto.

11. In a device of the kind described, a protractor scale ring, a slide ring rotatably slidable relative to said scale ring, each ring having a radial leg, said legs having pointed terminals at their inner ends normally converging at the axis of rotation of said rings, an off-set bracket means connected with each ring for supporting their respective legs, means associating said legs with said bracket means for limited longitudinal adjustment thereon, means for locking said legs in desired adjusted position, a vernier scale plate movable with said slide ring having its scale arranged to coöperate with the scale of said scale ring, a carrier plate secured to said scale ring, a chuck-plate mounted in connection with said carrier plate for rotation about the axis of said rings, means permitting a limited rotative adjustment of said chuck-plate, means for locking said chuck-plate in adjusted position, a marker bar, means for slidably supporting said marker bar in association with said slide ring leg and means at the inner end of said marker bar for supporting a marking tool.

12. In a device of the kind described, a protractor scale ring, a slide ring rotatably slidable relative to said scale ring, each ring having a radial leg, said legs having pointed terminals at their inner ends normally converging at the axis of rotation of said rings, an off-set bracket means connected with each ring for supporting their respective legs, means associating said legs with said bracket means for limited longitudinal adjustment thereon, means for locking said legs in desired adjusted position, a vernier scale plate movable with said slide ring having its scale arranged to coöperate with the scale of said scale ring, a carrier plate secured to said scale ring, a chuck-plate mounted in connection with said carrier plate for rotation about the axis of said rings, means permitting a limited rotative adjustment of said chuck plate, means for locking said chuck-plate in adjusted position, a marker bar, means for slidably supporting said marker bar in association with said slide ring leg, means at the inner end of said marker bar for supporting a marking tool, and a laterally extending arm connected with the inner end of said marker bar adapted when said legs of said respective rings are closed in normal initial position to extend across said scale ring leg at right angles thereto.

13. In a device of the kind described, a protractor scale ring, a slide ring rotatably slidable relative to said scale ring, each ring having a radial leg, said legs having pointed terminals at their inner ends normally converging at the axis of rotation of said rings, an off-set bracket means connected with each ring for supporting their respective legs, means associating said legs with said bracket means for limited longitudinal adjustment thereon, means for locking said legs in desired adjusted position, a vernier scale plate movable with said slide ring having its scale arranged to coöperate with the scale of said scale ring, a carrier plate secured to said scale ring, a chuck-plate mounted in connection with said carrier plate for rotation about the axis of said rings, means permitting a limited rotative adjustment of said chuck-plate, means for locking said chuck-plate in adjusted position, a marker bar, means for slidably supporting said marker bar in association with said slide ring leg, means at the inner end of said marker bar for supporting a marking tool, said marker bar having a calibrated scale, said marker bar supporting means having a vernier scale coöperating with the scale of said marker bar, a thrust block on said marker bar having a nut piece assembled therewith, a vernier adjusting screw connected with said marker bar supporting means with which said nut piece is engaged, and means for locking said thrust block in secured relation to said marker bar.

14. In a device of the kind described, a protractor scale ring, a slide ring rotatably slidable relative to said scale ring, each ring having a radial leg, said legs having pointed terminals at their inner ends normally converging at the axis of rotation of said rings, an off-set bracket means connected with each ring for supporting their respective legs, means associating said legs with said bracket means for limited longitudinal adjustment thereon, means for locking said legs in desired adjusted position, a vernier scale plate movable with said slide ring having its scale arranged to coöperate with the scale of said scale ring, a carrier plate secured to said scale ring, a chuck-plate mounted in connection with said carrier plate for rotation about the axis of said rings, means permitting a limited rotative adjustment of said chuck-plate, means for locking said chuck-plate in adjusted position, a marker bar, means for slidably supporting said marker bar in association with said slide ring leg, means at the inner end of said marker bar for supporting a marking tool, said marker bar having a calibrated scale, said marker bar supporting means having a vernier scale coöperating with the scale of said marker bar, a thrust block on said marker bar having a nut piece assembled therewith, a vernier adjusting screw connected with said marker bar supporting means with which said nut piece is engaged, means for locking said thrust block in secured relation to said marker bar, and a laterally extending arm connected with the inner end of said marker bar adapted when said legs of said respective rings are closed in normal initial position to extend across said scale ring at right angles thereto.

15. In a device of the kind described, a protractor scale ring, a slide ring rotatably slidable relative to said scale ring, each ring having a radial leg, said legs having pointed terminals at their inner ends normally converging at the axis of rotation of said rings, an off-set bracket means connected with each ring for supporting their respective legs, means associating said legs with said bracket means for limited longitudinal adjustment thereon, means for locking said legs in desired adjusted position, a vernier scale plate movable with said slide ring having its scale arranged to coöperate with the scale of said scale ring, a carrier plate, means for fixing said carrier plate to the outer face of said scale ring, said carrier plate having a central bearing alined with the axis of rotation of said rings, a chuck-plate off-set from the face of said slide ring, said chuck plate having a central stem journaled in said bearing of said carrier plate, coöperating stops means associated with said chuck-plate and said carrier plate permitting a limited rotative adjustment of said chuck plate, means for securing said chuck-plate to said carrier plate and locking the same in desired adjusted position, a marker bar, means slidably supporting said marker bar in association with said slide ring leg, and means at the inner end of said marker bar for supporting a marking tool.

16. In a device of the kind described, a a protractor scale ring, a slide ring rotatably slidable relative to said scale ring, each ring having a radial leg, said legs having pointed terminals at their inner ends normally converging at the axis of rotation of said rings, an off-set bracket means connected with each ring for supporting their respective legs, means associating said legs with said bracket means for limited longitudinal adjustment thereon, means for locking said legs in desired adjusted position, a vernier scale plate movable with said slide ring having its scale arranged to coöperate with the scale of said scale ring, a carrier plate, means for fixing said carrier plate to the outer face of said scale ring, said carrier plate having a central bearing alined with the axis of rotation of said rings, a chuck-plate off-set from the face of said slide ring, said chuck-plate having a central stem journaled in said bearing of said carrier plate, coöperating stop means associated with said chuck-plate and said carrier plate permitting a limited rotative adjustment of said chuck plate, means for securing said chuck-plate to said carrier plate and locking the same in desired adjusted position, a marker bar, means slidably supporting said marker bar in association with said slide ring leg, means at the inner end of said marker bar for supporting a marking tool, and a laterally extending arm connected with the inner end of said marker bar adapted when said legs of said respective rings are closed in normal initial position to extend across said scale ring leg at right angles thereto.

17. In a device of the kind described, a protractor scale ring, a slide ring rotatably slidable relative to said scale ring, each ring having a radial leg, said legs having pointed terminals at their inner ends normally converging at the axis of rotation of said rings, an off-set bracket means connected with each ring for supporting their respective legs, means associating said legs with said bracket means for limited longitudinal adjustment thereon, means for locking said legs in desired adjusted position, a vernier scale plate movable with said slide ring having its scale arranged to coöperate with the scale of said scale ring, a carrier plate, means for fixing said carrier plate to the outer face of said scale ring, said carrier plate having a central bearing alined with the axis of rotation of said rings, a chuck-plate off-set from the face of said slide ring, said chuck-plate having a central stem journaled in said bearing of said carrier plate, coöperating stop means associated with said chuck-plate and said carrier plate permitting a limited rotative adjustment of said chuck-plate, means for securing said chuck-plate to said carrier plate and locating the same in desired adjusted position, a marker bar, means slidably supporting said marker bar in association with said slide ring leg, means at the inner end of said marker bar for supporting a marking tool, said marker bar having a calibrated scale, said marker bar supporting means having a vernier scale coöperating with the scale of said marker bar, a thrust block on said marker bar having a nut piece assembled therewith, a vernier adjusting screw connected with said marker bar supporting means with which said nut piece is engaged, and means for locking said thrust block in secured relation to said marker bar.

18. In a device of the kind described, a protractor scale ring, a slide ring rotatably slidable relative to said scale ring, each ring having a radial leg, said legs having pointed terminals at their inner ends normally converging at the axis of rotation of said rings, an off-set bracket means connected with each ring for supporting their respective legs, means associating said legs with said bracket means for limited longitudinal adjustment thereon, means for locking said legs in desired adjusted position, a vernier scale plate movable with said slide ring having its scale arranged to coöperate with the scale of said scale ring, a carrier plate, means for fixing said carrier plate to the outer face of said scale ring, said carrier plate having a central bearing alined with the axis of rotation of said rings, a chuck-plate off-set from the face of said slide ring, said chuck-plate having a central stem journaled in said bearing of said carrier plate, coöperating stop means associated with said chuck-plate and said carrier plate permitting a limited rotative adjustment of said chuck-plate, means for securing said chuck-plate to said carrier plate and locking the same in desired adjusted position, a marker bar, means slidably supporting said marker bar in association with said slide ring leg, means at the inner end of said marker bar for supporting a marking tool, said marker bar having a calibrated scale, said marker bar supporting means having a vernier scale coöperating with the scale of said marker bar, a thrust block on said marker bar having a nut piece assembled therewith, a vernier adjusting screw connected with said marker bar supporting means with which said nut piece is engaged, means for locking said thrust block in secured relation to said marker bar, and a laterally extending arm connected with the inner end of said marker bar adapted when said legs of said respective rings are closed in normal initial position to extend across said scale ring leg at right angles thereto.

19. In a device of the kind described, a protractor scale ring, a slide ring rotatably slidable relative to said scale ring, each ring having a radial leg, said legs having pointed terminals at their inner ends normally converging at the axis of rotation of said rings, an off-set bracket means connected with each ring for supporting their respective legs, means associating said legs with said bracket means for limited longitudinal adjustment thereon, means for locking said legs in desired adjusted position, a vernier scale plate movable with said slide ring having its scale arranged to coöperate with the scale of said scale ring, a carrier plate, means for fixing said carrier plate to the outer face of said scale ring, said carrier plate having a central bearing alined with the axis of rotation of said rings, a chuck-plate off-set from the face of said slide ring, said chuck-plate having a central stem journaled in said bearing of said carrier plate, coöperating stop means associated with said chuck plate and said carrier plate permitting a limited rotative adjustment of said chuck-plate, means for securing said chuck-plate to said carrier plate and locking the same in desired adjusted position, a marker bar, means at the inner end of said marker bar for supporting a marking tool, a slideway member in which said marker bar is mounted for longitudinal movement, means for detachably securing said slideway member in angularly off-set relation to said slide ring leg so that a marking tool carried at the inner end of said marker bar may be alined with the axis of rotation of said rings, a calibrated scale on said marker bar, means for locking said marker bar against movement through said slideway member, a vernier scale on said slideway member to coöperate with said marker bar scale, a thrust block on said marker bar, a nut piece supported in operative relation to said thrust block, a vernier adjusting screw connected with said slideway member with which said nut piece is engaged, and means for locking said thrust block in secured relation to said marker bar.

20. In a device of the kind described, a protractor scale ring, a slide ring rotatably slidable relative to said scale ring, each ring having a radial leg, said legs having pointed terminals at their inner ends normally converging at the axis of rotation of said rings, an off-set bracket means connected with each ring for supporting their respective legs, means associating said legs with said bracket means for limited longitudinal adjustment thereon, means for locking said legs in desired adjusted position, a vernier scale plate movable with said slide ring having its scale arranged to coöperate with the scale of said scale ring, a carrier plate, means for fixing said carrier plate to the outer face of said scale ring, said carrier plate having a central bearing alined with the axis of rotation of said rings, a chuck-plate off-set from the face of said slide ring, said chuck-plate having a central stem journaled in said bearing of said carrier plate, coöperating stop means associated with said chuck plate and said carrier plate permitting a limited rotative adjustment of said chuck-plate, means for securing said chuck-plate to said carrier plate and locking the same in desired adjusted position, a marker bar, means at the inner end of said marker bar for supporting a marking tool, a slideway member in which said marker bar is mounted for longitudinal movement, means for detachably securing said slideway member in angularly off-set relation to said slide ring leg so that a marking tool carried at the inner end of said marker bar may be alined with the axis of rotation of said rings, a calibrated scale on said marker bar, means for locking said marker bar against movement through said slideway member, a vernier scale on said slideway member to coöperate with said marker bar scale, a thrust block on said marker bar, a nut piece supported in operative relation to said thrust block, a vernier adjusting screw connected with said slideway member with which said nut piece is engaged, means for locking said thrust block in secured relation to said marker bar, and a laterally extending arm connected with the inner end of said marker bar adapted when said legs of said respective rings are closed in normal initial position to extend across said scale ring leg at right angles thereto.

In testimony, that I claim the invention set forth above I have hereunto set my hand this 27th day of March, 1920.

MAXIMILIAN NOWAK.

Witnesses:
GEORGE D. RICHARDS,
H. THEODORE SORG.